United States Patent [19]

Hug et al.

[11] Patent Number: 5,072,338

[45] Date of Patent: * Dec. 10, 1991

[54] INSPECTION/DETECTION SYSTEM WITH A LASER MODULE FOR USE IN FORENSIC APPLICATIONS

[76] Inventors: William F. Hug, 382 E. California Boulevard, #106, Pasadena, Calif. 91106; Edwin A. Reed, 1092 W. 17th St., Upland, Calif. 91786; Ray D. Reid, 1125 E. Foothill, #5, Glendora, Calif. 91740

[*] Notice: The portion of the term of this patent subsequent to Jun. 12, 2007 has been disclaimed.

[21] Appl. No.: 535,958

[22] Filed: Jun. 11, 1990

Related U.S. Application Data

[63] Continuation-in-part of Ser. No. 195,788, May 19, 1988, Pat. No. 4,933,816, which is a continuation-in-part of Ser. No. 20,695, Mar. 2, 1987, abandoned.

[51] Int. Cl.$^5$ .............................................. F21V 8/00
[52] U.S. Cl. ..................................... 362/32; 362/259; 362/294; 362/373; 372/6
[58] Field of Search ................. 362/32, 259, 294, 373; 372/6, 23, 33, 65, 61, 101, 108

[56] References Cited

U.S. PATENT DOCUMENTS 4,530,098 7/1985 Karaki ................................. 372/108

Primary Examiner—Ira S. Lazarus
Assistant Examiner—Sue Hagarman
Attorney, Agent, or Firm—W. Edward Johansen

[57] ABSTRACT

An inspection/detection system for use in forensic applications includes a carrying case, a high intensity lamp assembly and a plurality of notch filters. The carrying case has a cover-lid and is a rectangular box with a closed end and an open end to which the cover-lid is hingedly coupled. The high intensity lamp assembly generates light energy of multiple wavelengths within the visible spectrum and infrared spectrum. The high intensity lamp assembly has an output aperture and is mounted within the carrying case. A power supply unit is mounted within the carrying case and energizes the high intensity lamp assembly in order to generate light energy therefrom. An optical connector is optically coupled to the output aperture of the high intensity lamp assembly. A flexible optical fiber cable is optically coupled to the optical connector. Each notch filter is composed of a low band filter and a high band filter in order to provide a plurality of selectable high resolution outputs of light energy in order to filter out all of the light energy which is not inside a narrow wavelength band; The mounting mechanism selects and optically couples one of the notch filters to the optical connector in order to provide an output of light energy of high resolution; The remote control handpiece has beam control optics and is optically coupled to the flexible optical fiber cable so that the output of light energy of high resolution can be shined onto a material thereby causing the material to luminesce and become detectable.

1 Claim, 3 Drawing Sheets ic-Optical Instrumentation Engineers in Jan. 1988
INSPECTION/DETECTION SYSTEM WITH A LASER MODULE FOR USE IN FORENSIC APPLICATIONS This is continuation-in-part of an application, filed May 19, 1988 under Ser. No. 195,788 now U.S. Pat. No. 4,933,816 which is a continuation-in-part of an application, filed Mar. 2, 1987 under Ser. No. 020,695 now abandoned.

BACKGROUND OF THE INVENTION

1. Field of the Invention

The present invention relates to an inspection/detection systems for use in forensic applications and more particularly to an inspection/detection system which has a laser module and which is not only portable and lightweight so that the inspection/detection system may be utilized at field sites, but which also does not require skilled personnel to operate thereby reducing the complexity and operating cost thereof.

2. Description of the Prior Art

In *OE Reports*, which is the International Newspaper of Optical and Optoelectronic Applied Science and Engineering, Number 49, published by the Society of Photo-Optical Instrumentation Engineers in Jan. 1988 beginning on page 1 there is an article, entitled "Laser Detection: Scotland Yard's High Tech Crime Fighting Techniques", by K. E. Creer. Creer described Scotland Yard's use of ultraviolet light and fluorescence. U.S. Pat. No. 4,504,408, entitled Fluorescent Vapor Fumes for Use with a Self-contained Fingerprinting Kit, issued to William P. Morton on Mar. 12, 1985, teaches a vapor phase activator pad which produces fluorescent fumes for use in fuming an object, which is suspected of containing in an enclosed area latent fingerprints. An ultraviolet light is shined on the fumed object to expose the latent fingerprints.

Creer also described Scotland Yard's use of the Neodymium:YAG laser system. U.S. Pat. No. 4,507,789, entitled YAG Laser System, issued to Richard T. Daly on Mar. 26, 1985, teaches a reliable, lightweight low cost YAG laser system which includes a resonator cavity which is disposed inside a housing, a power supply unit and a cooling system for cooling the resonator cavity. The power supply unit is electrically coupled to the resonator cavity. It is unlikely that the power supply is disposed inside the housing.

An inspection/detection system recently marketed by Cooper LaserSonics Inc. is directed to forensic applications. The inspection/detection system includes a laser system and is adapted for use at field sites. However, the inspection/detection system is relatively heavy weighing approximately 120 pounds and consists of at least three separate subassemblies which must be reassembled at the field site before it can be utilized. The inspection/detection system needs frequent adjustments and cleaning and requires the services of skilled maintenance personnel thereby adding to the operating costs thereof.

Creer further described an inspection/detection system which includes a laser module and which is a portable and lightweight. The inspection/detection system also includes a power supply unit, a heat exchanger, a cooling fan, a focusing lens, an optical fiber connector and a shutter assembly, a flexible optical fiber cable and a remote control handpiece with beam control optics.

U.S. Pat. No. 4,230,902, entitled Modular Laser Printing System, issued to William F. Hug and Leonard C. De Benedict on Oct. 28, 1980, teaches a laser printing system wherein the laser module is replaceable. However, the laser printing system itself and the laser module is not portable in the sense that the laser printing system is not designed to be moved to different sites. Argon laser systems have found wide use in lightweight printers. Argon laser systems have not been used in a stand-alone inspection/identification system. Furthermore, the wavelength of light energy which the argon laser system produces causes latent materials, such as finger prints and hair strands to luminesce so that they become detectable. Argon laser system have not been used in a non-stationary, field environment.

U.S. Pat. No. 3,471,215, entitled Fiber Laser Device Provided with Long Flexible Energy-Directing Probe-like Structure, issued to Elias Snitzer on Oct. 7, 1969, teaches a fiber laser device which includes a laser which generates light energy and a thin, long, flexible readily manipulatable fiber for redirecting the laser energy as a beam of small controlled size onto hard-to-reach parts of body cavities.

U.S. Pat. No. 4,011,403, entitled Fiber Optic Laser Illuminators, issued to Max Epstein and Michael E. Marhic on Mar. 8, 1977, teaches an object-illuminating and imaging system which utilizes, in combination, laser beam as a light source and an optical fiber as a light transmitter. Film may be used usually to reproduce illuminated object.

U.S. Pat. No. 4,114,112, entitled Apparatus and Method for Efficient Synthesis of Laser Light, issued to Max Epstein, Michael E. Marhic and Samuel E. Schacham on Sept. 12, 1978, teaches an apparatus synthesizing laser light which is characterized by a plurality of discrete wavelengths.

U.S. Pat. No. 4,681,396, entitled High Power Laser Energy Delivery System, issued to Marshall G. Jones on July 21, 1987, teaches a quartz optical fiber to a spot having a size smaller than the fiber diameter and with a beam cone angle less than twice the numerical aperture of the fiber. The fiber transmits the light energy from Neodymium:YAG laser system to emerge at the other end where the light energy is collimated and focused onto material to be processed.

U.S. Pat. No. 3,647,275, entitled Identification System using Reference Beam Coded Holograms, issued to John H. Ward on Mar. 7, 1972, teach an identification system which identifies persons, articles, documents. U.S. Pat. No. 3,704,949, entitled Method and Apparatus for Personal Identification, issued to Carlton E. Thomas and Gary D. Cochran on Dec. 5, 1972, teaches an apparatus which creates an encoded fingerprint card which consists of a hologram of a fingerprint. U.S. Pat. No. 4,627,068, entitled Fiber Optics Interface for a Dye Lasrr Oscillator and Method, issued to Steve A. Johnson on Dec. 2, 1986, teaches a dye laser oscillator. U.S. Pat. No. 3,716,301, entitled Fingerprint Identification Apparatus, issued to Henry John Caulfield and Dean Roger Perkins on Feb. 13, 1973, teaches a coherent optical processor fingerprint identification apparatus in which identification is established by correlating an optical beam pattern representative of the finger to be identified with a prerecorded Fourier transform spatial filter of the fingerprint. The aforementioned patents disclose fingerprint identification techniques. The laser systems which are utilized are known as stationary laser systems in that the laser systems are fixed and are not for use in the field. In forensic applications, this restriction severely limits the use of a laser system for on-site crime investigation.

SUMMARY OF THE INVENTION

In view of the foregoing factors and conditions which are characteristic of the prior art it is the primary object of the present invention to provide an inspection/detection systems for use in forensic applications which has an infrared light assembly.

It is another object of the present invention to provide an inspection/detection systems for use in forensic applications which is portable and lightweight so that the inspection/detection system ma be utilized at field sites.

It is still another object of the present invention to provide an inspection/ detection systems for use in forensic applications which does not require skilled personnel to operate thereby reducing the complexity and operating cost thereof.

In accordance with an embodiment of the present invention an inspection/detection system for use in forensic applications is described. The inspection/detection system includes An inspection/detection system for use in forensic applications includes a carrying case, a high intensity lamp assembly and a plurality of notch filters. The carrying case has a cover-lid and is a rectangular box with a closed end and an open end to which the cover-lid is hingedly coupled. The high intensity lamp assembly generates light energy of multiple wavelengths within the visible spectrum and infrared spectrum. The high intensity lamp assembly has an output aperture and is mounted within the carrying case. A power supply unit is mounted within the carrying case and energizes the high intensity lamp assembly in order to generate light energy therefrom. An optical connector is optically coupled to the output aperture of the high intensity lamp assembly. A flexible optical fiber cable is optically coupled to the optical connector. Each notch filter is composed of a low band filter and a high band filter in order to provide a plurality of selectable high resolution outputs of light energy in order to filter out all of the light energy which is not inside a narrow wavelength band; The mounting mechanism selects and optically couples one of the notch filters to the optical connector in order to provide an output of light energy of high resolution; The remote control handpiece has beam control optics and is optically coupled to the flexible optical fiber cable so that the output of light energy of high resolution can be shined onto a material thereby causing the material to luminesce and become detectable. A cooling assembly includes an infrared reflecting lens and an energy absorber pad wherein the infrared reflecting lens reflects into the energy absorber pad all of the light energy which is within the infrared spectrum and transmits all of the light energy within the visible spectrum in order to cool the carrying case.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
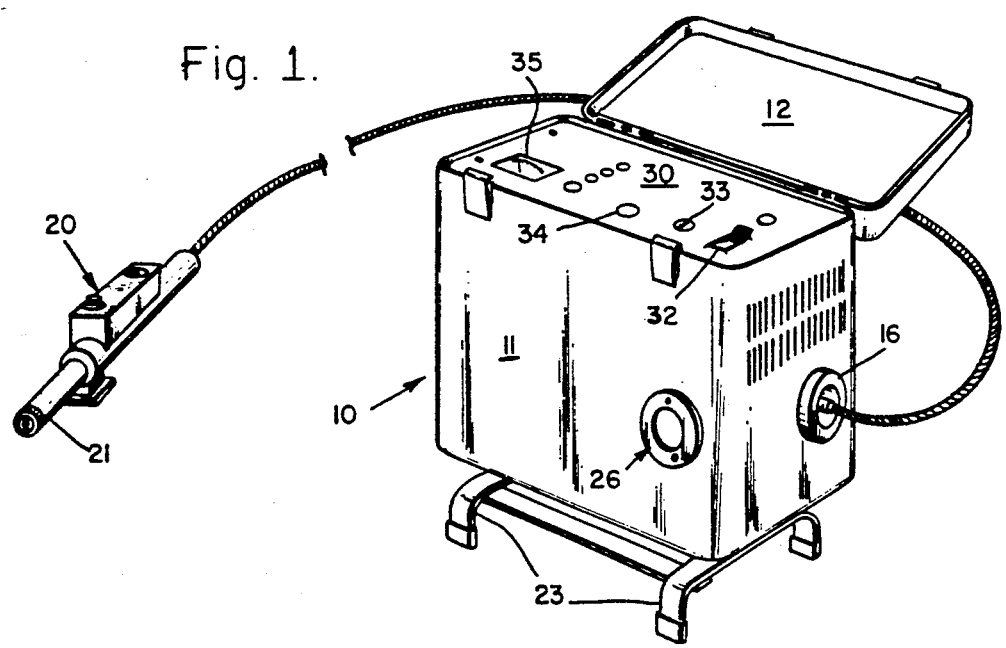
FIG. 1 is a perspective view of a first inspection/detection system for use in forensic applications which has a first control panel and which has been constructed in accordance with the principles of a first embodiment of the present invention.
Figure 2:
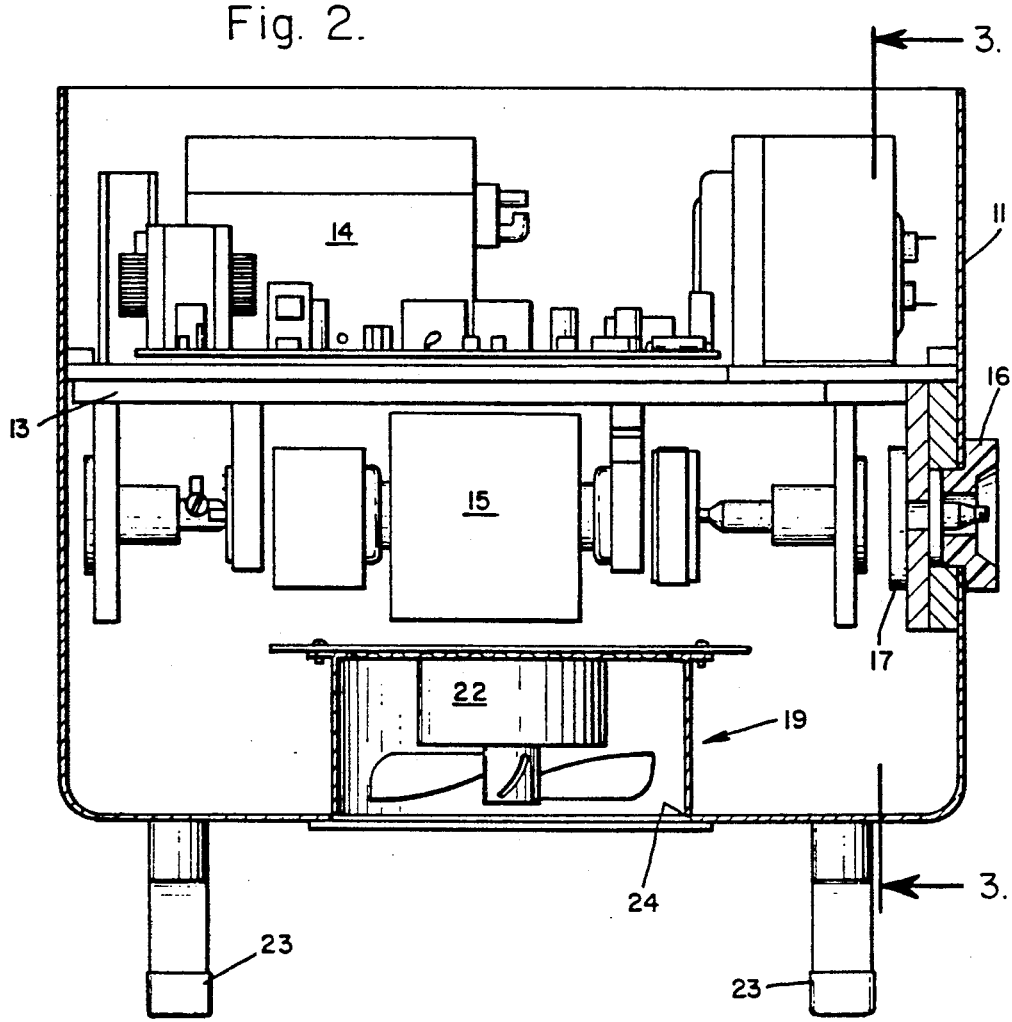
FIG. 2 is a front elevational view in cross-section of the first inspection/detection system of FIG. 1.
Figure 3:
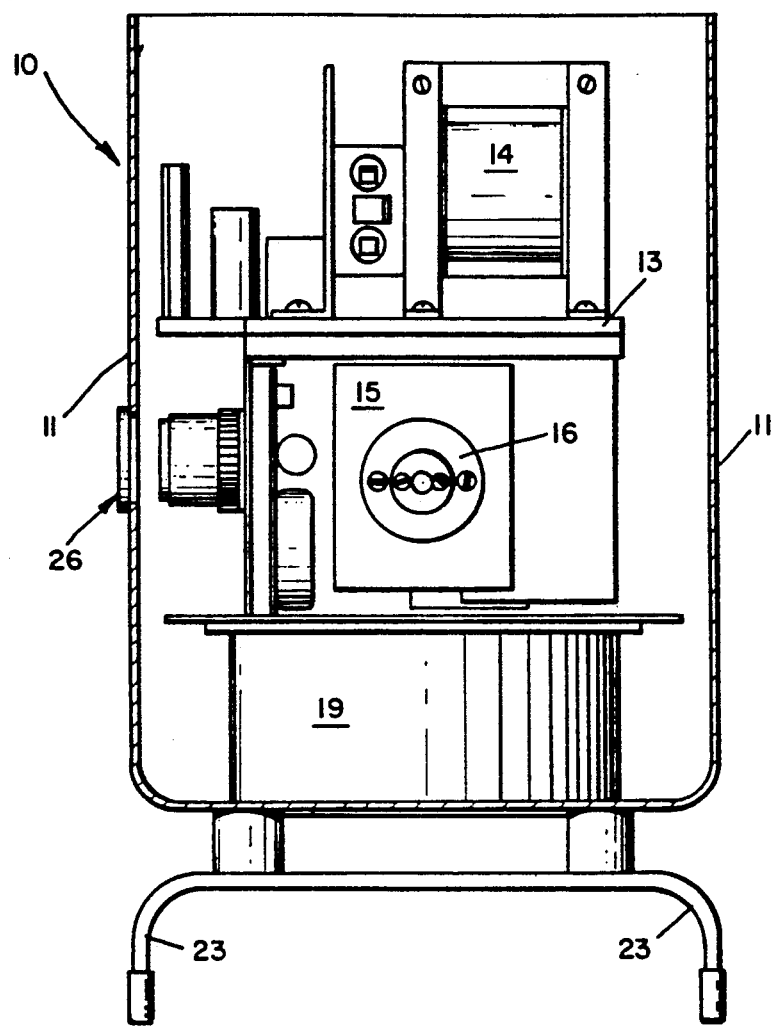
FIG. 3 is a left-side elevational view in cross-section of the first inspection/detection system of FIG. 1 taken along line 3—3 of FIG. 2.
Figure 4:
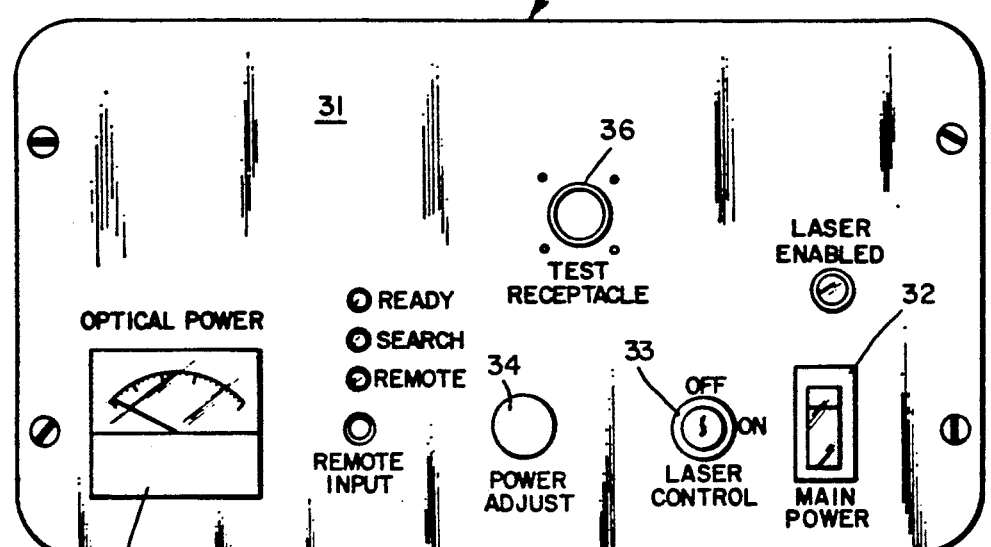
FIG. 4 is a top plan view of the first control panel of the first inspection/detection system of FIG. 1.

In order to best understand the present invention it is necessary to refer to the following description of its preferred embodiment in conjunction with the accompanying drawing. Referring to FIG. 1 in conjunction with FIG. 2 a first inspection/detection system 10 for use in forensic applications includes a first carrying case 11 which has a first cover-lid 12, a first base plate 13, a first power supply unit 14 and a laser module 15. The first carrying case 11 is a rectangular box with a closed end and an open end to which the first cover-lid 12 is hingedly coupled. The laser module 15 is disposed within the first carrying case 11 and is mounted on the first base plate 13. The laser module 15 has an output aperture. The first power supply unit 14 is disposed within the first carrying case 11 and is mounted on the first base plate 13. The first power supply unit 14 energizes the laser module to generate light energy therefrom. The first inspection/detection system 10 also includes a focusing lens 16, an optical connector 17 and a shutter assembly 18. The focusing lens 16 is optically coupled to the output aperture of the laser module 15. The optical connector 17 is optically coupled to the focusing lens 17. The shutter assembly 18 is optically coupled to the optical connector 17. The first inspection/detection system 10 further includes a first flexible optical fiber cable 19, a first remote control handpiece 20 and a first heat exchanger 21. The first flexible optical fiber cable 19 is optically coupled to the optical connector 17. The remote control handpiece 20 has beam control optics 22 and is optically coupled to the flexible optical fiber cable 19 so that the light energy from the laser module 15 can be shined onto latent materials. The heat exchanger 21 includes a cooling fan 23 in order to cool the laser module 15 and is disposed within the first carrying case 11. The light energy from the laser module 15 causes the latent materials to luminesce and become detectable.

Figure 5:
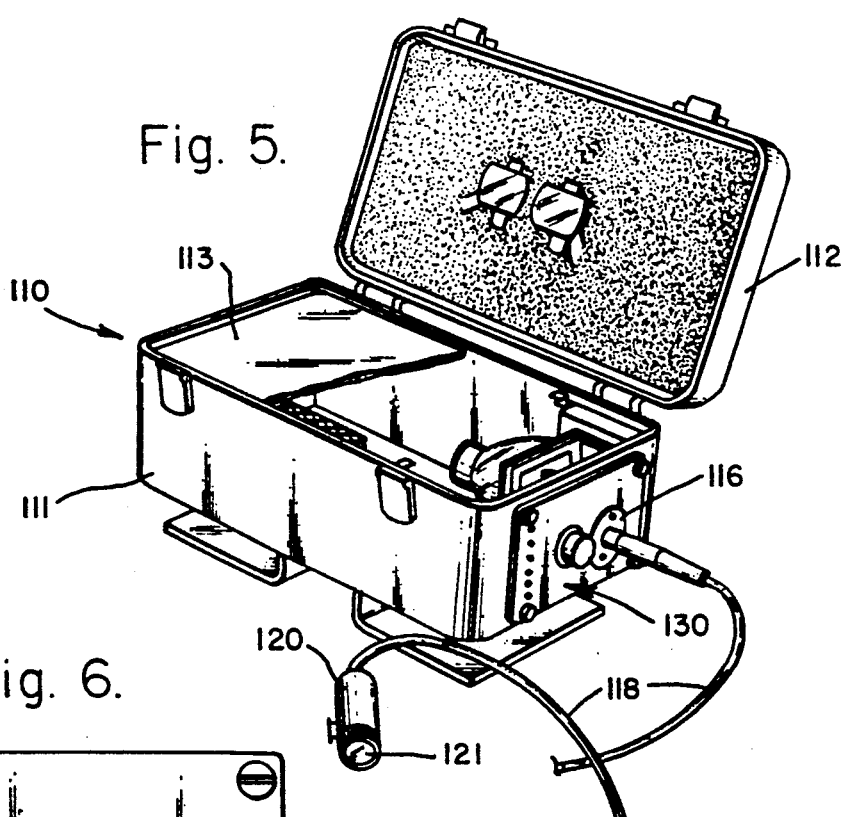
FIG. 5 is a perspective view of a second inspection/detection system for use in forensic applications which has a second control panel and which has been constructed in accordance with the principles of a second embodiment of the present invention.
Figure 6:
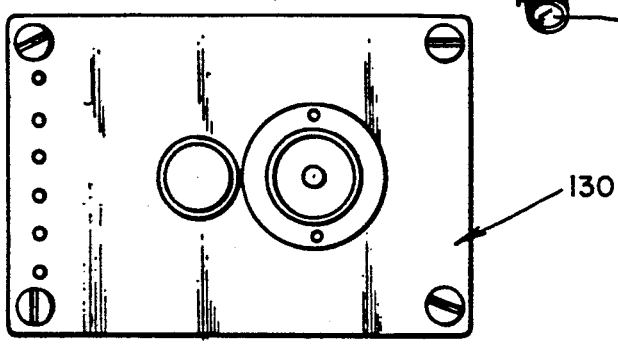
FIG. 6 is a top plan view of the second control panel of the second inspection/detection system of FIG. 1.
Figure 7:
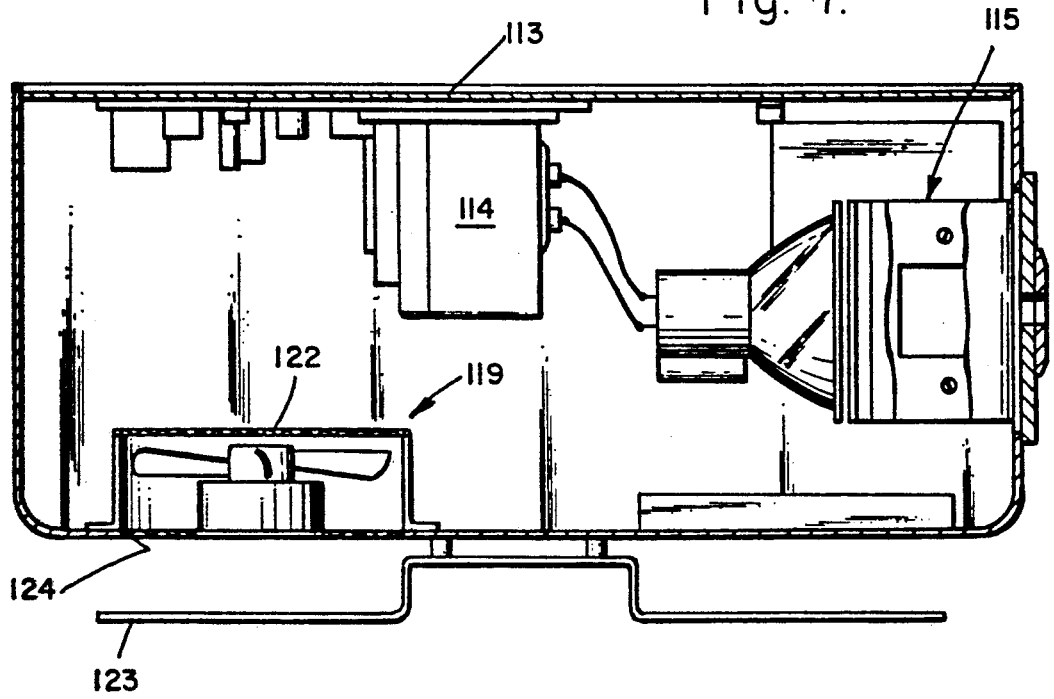
FIG. 7 is a front elevational view in cross-section of the second inspection/detection system of FIG. 5.

Referring to FIG. 5 in conjunction with FIG. 6 and FIG. 7 a second inspection/detection system 110 for use in forensic applications includes a second carrying case 111 which has a second cover-lid 112, a second base plate 113, a second power supply unit 114 and a light assembly 115. The second carrying case 111 is a rectangular box with a closed end and an open end to which the second cover-lid 112 is hingedly coupled. The light assembly 115 is disposed within the second carrying case 111 and is mounted on the second base plate 113. The light assembly 115 has an output aperture. The second power supply unit 114 is disposed within the second carrying case 111 and is mounted on the second base plate 113. The second power supply unit 114 energizes the light assembly 115 to generate light energy therefrom.

The second inspection/detection system 110 also includes a focusing lens 116, an optical connector 117 and a shutter assembly 118. The focusing lens 116 is optically coupled to the output aperture of the light assembly 115. The optical connector 117 is optically coupled to the focusing lens 117. The shutter assembly 118 is optically coupled to the optical connector 117. The second inspection/ detection system 110 further includes a second flexible optical fiber cable 119, a second remote control handpiece 120 and a second heat exchanger 121. The second flexible optical fiber cable 119 is optically coupled to the optical connector 117. The remote control handpiece 120 has beam control optics 122 and is optically coupled to the flexible optical fiber cable 119 so that the light energy from the light assembly 115 can be shined onto latent materials. The heat exchanger 121 includes a cooling fan 123 in order to cool the laser module 13 and is disposed within the second carrying case 111. The light energy from the light assembly 115 cause the latent materials to luminesce and become detectable.

A bright light module 130 includes a light 131 which is mounted within the carrying case 111 and has an output aperture. The power supply unit is mounted within the carrying case 111 and energizes the bright light module 131 to generate light energy therefrom. The focusing lens is optically coupled to the output aperture of the bright light module 131. The heat exchanger cools the bright light module 130. The heat exchanger is disposed within the carrying case 111. Each of the plurality of notch filters 136 is composed of a low band filter and a high band filter in order to provide a plurality of selectable high resolution outputs of light energy in order to filter out all of the light energy which is not inside a narrow wavelength band. The mounting mechanism 135 selects and optically couples one of the notch filters 136 to the optical connector in order to provide an output of light energy of high resolution. The cooling assembly 140 includes an infrared reflecting lens 141 and an energy absorber pad 142. The infrared reflecting lens 141 reflects into the energy absorber pad 142 all of the light energy which is within the infrared spectrum and transmits all of the light within the visible spectrum in order to cool the carrying case 111 so that the output of light energy of high resolution causes the material to luminesce and become detectable.

From the forgoing it can be seen than an inspection/detection system for use in forensic applications has been described. It should be noted that distances of and between the figures are not to be considered significant.

Accordingly it is intended that the foregoing disclosure and showing made in the drawing shall be considered only as an illustration of the principles of the present invention.

What is claimed is:

1. An inspection/detection system for use in forensic applications, said inspection/detection system comprising:
   a. a carrying case having a cover-lid and being a rectangular box with a closed end and an open end to which said cover-lid is hingedly coupled;
   b. a high intensity lamp assembly which generates light energy of multiple wavelengths within the visible spectrum and infrared spectrum, said high intensity lamp assembly having an output aperture and being mounted within said carrying case;
   c. a power supply unit being mounted within said carrying case, said power supply energizing said high intensity lamp assembly to generate light energy therefrom;
   d. an optical connector being optically coupled to said output aperture of said high intensity lamp assembly;
   e. a flexible optical fiber cable being optically coupled to said optical connector;
   f. a plurality of notch filters each of which is composed of a low band filter and a high band filter in order to provide a plurality of selectable high resolution outputs of light energy in order to filter out all of said light energy which is not inside a narrow wavelength band;
   g. mounting means for selecting and optically coupling one of said notch filters to said optical connector in order to provide an output of light energy of high resolution;
   h. a remote control handpiece having beam control optics and being optically coupled to said flexible optical fiber cable so that said output of light energy of high resolution can be shined onto a material; and
   i. a cooling assembly which includes an infrared reflecting lens and an energy absorber pad wherein said infrared reflecting lens reflects into said energy absorber pad all of said light energy which is within the infrared spectrum and transmits all of said light within the visible spectrum in order to cool said carrying case so that said output of light energy of high resolution causes the material to luminesce and become detectable.

* * * * *